Jan. 31, 1961 R. J. ROWEKAMP 2,969,637
SYSTEM FOR CONVERTING SOLAR ENERGY INTO MECHANICAL ENERGY
Filed June 28, 1956 2 Sheets-Sheet 2
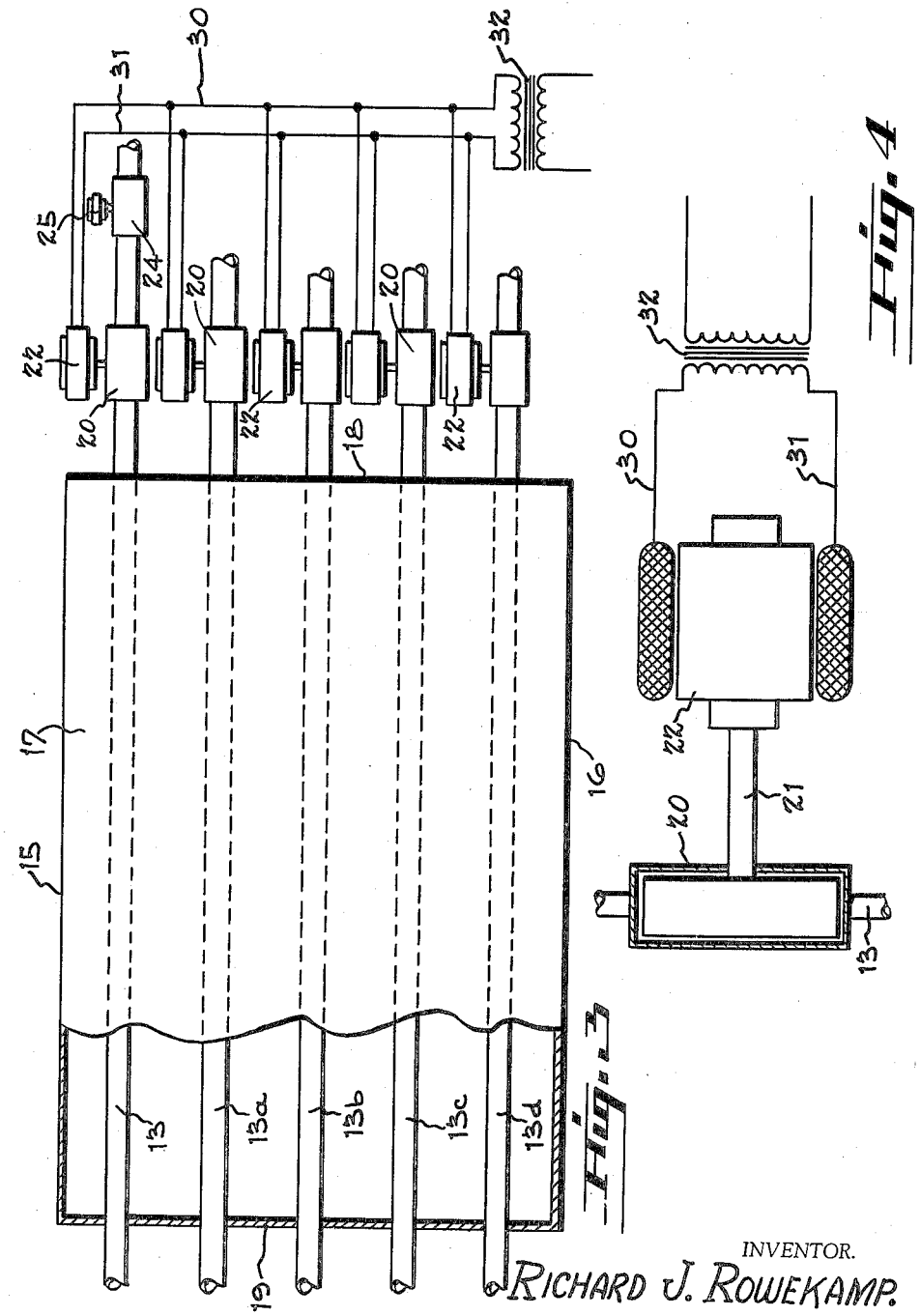
INVENTOR.
RICHARD J. ROWEKAMP.

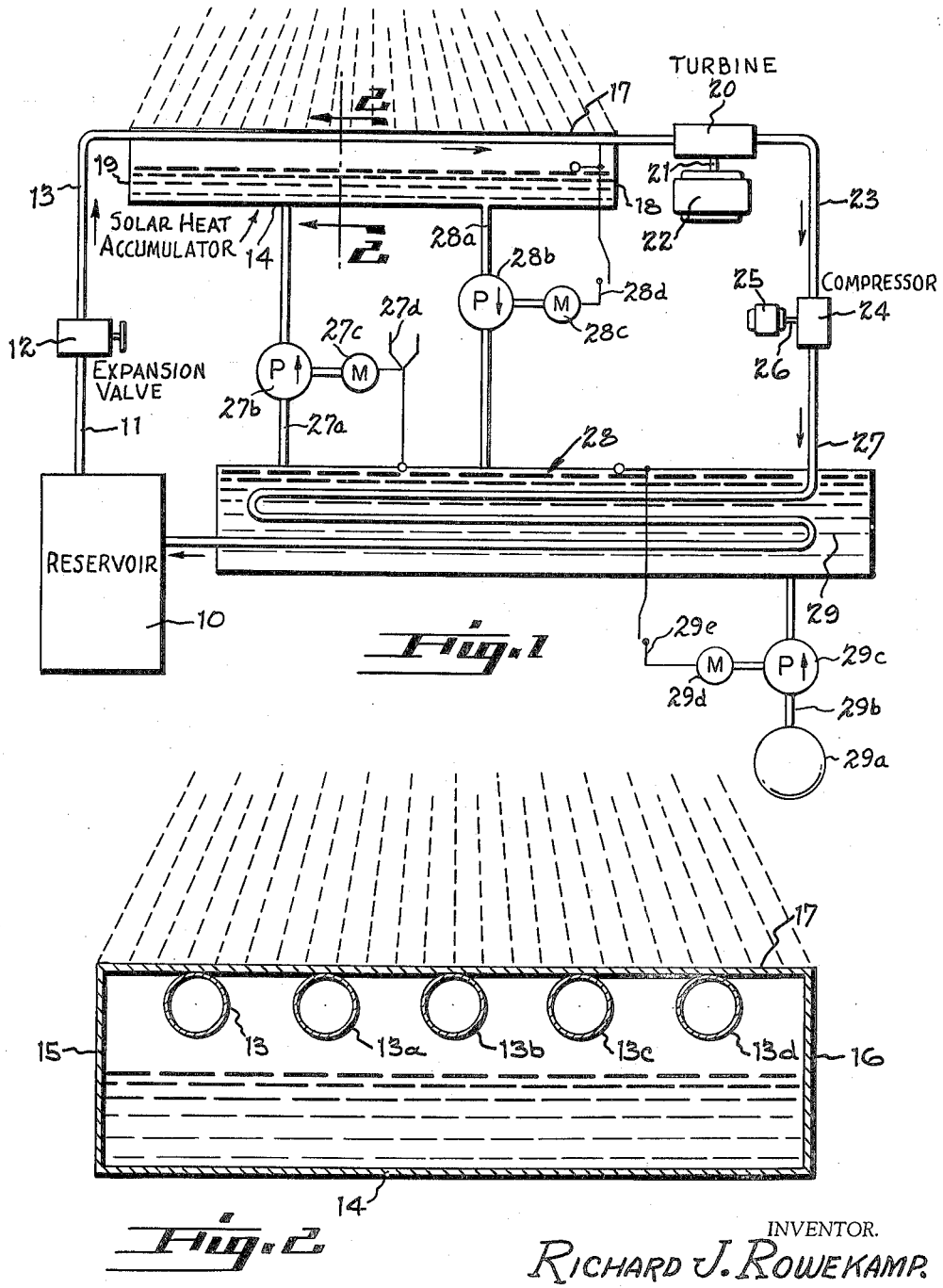

United States Patent Office 2,969,637
Patented Jan. 31, 1961

2,969,637

SYSTEM FOR CONVERTING SOLAR ENERGY INTO MECHANICAL ENERGY

Richard J. Rowekamp, 420 Hilltop Lane, Cincinnati, Ohio

Filed June 28, 1956, Ser. No. 594,584

1 Claim. (Cl. 60—26)

My invention relates to a method for converting sunlight into electrical energy.

In general, I use a system where a volatile liquid such as dichloro-difluro-methane is heated by means of exposure to sunrays with the resultant expansion of gases passing through a turbine having a shaft connected to the armature of an electric generator.

The principal object of my invention is to provide a method and device for raising the temperature of a volatile liquid such as dichloro-difluro-methane so that its expansion will create increased pressure, which will cause a turbine to be moved.

Another object of my invention is to decompress the gases after they leave the turbine to return them to their liquid state so that they may be re-used.

Still another object of my invention is to provide a method of converting sunlight through the medium of volatile liquid to spin a fan or turbine to generate electricity.

Another object of my invention is to provide a system of generating electricity wherein a volatile gas such as dichloro-difluro-methane is employed as the medium for transmitting the energy of the sun into mechanism to generate electricity.

Another object of my invention is to provide a piping system having a compressor which draws the expanding gases through pipes in a system compressing the gases, and raising their temperature, and then forcing the gases into condensing tubes to change the gases back into liquid.

Still another object of my invention is to provide a method of trapping air and hot water around the pipes through which the gaseous liquid travels.

In general my invention comprises a system of piping which is exposed to the sun, and which has flowing through it a volatile gaseous liquid. When this gaseous liquid is exposed to the rays of the sun, it tends to expand, to force a blade within a turbine to move, to generate electrical energy. The gas is then drawn by means of a compressor into a condenser unit from which it flows into a reservoir.

I also provide a metal casing which surrounds the pipe which is exposed to the rays of the sun and this metal casing has contained therein air and hot water which are pumped from the condenser unit, and which assist in the the expansion of the gases which are caused to flow from the reservoir.

My invention is more fully described in the detailed specification which follows and is shown in the drawings in which:

Fig. 1 is a schematic diagram of the elements which form my invention.

Fig. 2 is a detailed, sectional view taken along the lines 2—2 of Fig. 1.

Fig. 3 shows a plurality of pipes through which the gaseous substance passes, which pipes are directly connected to turbines and generators which connect to a transformer.

Fig. 4 shows a connection between a turbine, a shaft from said turbine, a generator transmitting low-voltage electriicty to a transformer which is relayed as high-voltage electricity.

In the drawings, the same reference numerals refer to the same or similar parts throughout the several views, and the sectional view taken along the sectional line is taken looking in the direction of the arrows at the end of the sectional line.

In the drawings I show a reservoir 10 connected by suitable piping means 11 to an expansion valve 12 which serves to restrain the gaseous liquid from returning to the reservoir. I provide pipe 13 which passes within a solar heating means comprising a container having a bottom wall 14, side walls 15 and 16, and top wall 17. Suitable end walls 18 and 19 are provided. The pipe passes through a turbine 20 which is secured by means of a shaft 21 to a generator 22. A pipe 23 connects the turbine with a compressor 24 run by an electric motor 25, connected to said compressor by shaft 26. The pipe 27 connects the compressor and runs within a condensing unit 28 filled with water 29.

The container 14—19 acts as a heat accumulator means for heating the liquid flowing thru pipe 13 during short periods when the solar energy supplied thereto is interrupted, said accumulator means 14—19 being supplied with water heated in condenser 28 via conduit 27a and pump 27b, said pump 27b being driven by electric motor 27c and controlled in response to temperature of the water in condenser 28 by temperature thermostat actuated means 27d. Excess water in the solar heat accumulator 14—19 is used to replenish water in condenser 28, said water passing thru conduit 28a and pump 28b, said pump 28b being driven by electric motor 28c and controlled by liquid level (float switch) responsive means 28d. An auxiliary means of replenishing water to the condenser is accomplished thru a water storage tank 29a, containing cold water, which is pumped thru conduit 29b by pump 29c, said pump 29c being driven by electric motor 29d and controlled by liquid level (float switch) responsive means 29e.

In Fig. 3 I show a series of pipes such as pipe 13 marked 13a, 13b, 13c and 13d. These pipes connect to turbines such as turbine 20 which are connected by means of a shaft to a generator 22 from which leads 30 and 31 connect to a transformer 32.

In Fig. 4 I show a turbine 20 mounted so that it is operable when the gaseous liquid passes through pipe 13 and which is connected by a shaft 21 to a generator 22. Low-voltage generated by the generator is transformed into high-voltage by transformer 32.

It will be apparent to those skilled in the art that by using sunlight and a volatile liquid such as dichloro-difluro-methane and causing said liquid to expand by direct action of the sun's rays upon it will cause the gas to spin a turbine, to move the shaft of the generator to generate electricity. The expansion of the gases creates a great pressure in the piping system and with the sunlight bringing about a rise in the temperature, the pressure and the velocity of the gases is increased.

In order to assist the operation of my device, I provide a compressor which tends to draw the expanding gases through the turbine and forces them into the condensing unit.

Having thus described my invention what I claim is new and useful and desire to secure by Letters Patent is:

A system for converting solar energy into mechanical energy comprising: a reservoir, solar heating means, a turbine having an inlet, an exhaust outlet and an output shaft; compressor means and a condenser; first conduit means connecting said reservoir to the inlet of said turbine and passing through said heating means, an expansion valve positioned in said conduit-means between said reservoir and said heating means; second conduit means connecting the exhaust outlet of said turbine to an inlet of said compressor; third conduit means connecting an outlet of the compressor with the reservoir and having a plurality of passes through said condenser: said system containing a highly volatile liquid; means for driving said compressor, said condenser containing cooling fluid, said heating means containing heat accumulator means, pump means for supplying fluid heated in said condenser to said heat accumulator, means for controlling said pump means, whereby the volatile liquid flowing in said system is heated and vaporized in said heating means for driving said turbine, said accumulator means heating said fluid during short periods when the solar energy is interrupted to said heating means, and means for replenishing fluid in said condenser.

References Cited in the file of this patent

UNITED STATES PATENTS

| | | |
|---|---|---|
| 230,323 | Melera et al. | July 20, 1880 |
| 659,450 | McHenry | Oct. 9, 1900 |
| 784,005 | Ketchum | Feb. 28, 1905 |
| 984,585 | McHenry | Feb. 21, 1911 |
| 1,002,768 | Shuman | Sept. 5, 1911 |
| 1,217,165 | Fessenden | Feb. 27, 1917 |
| 1,386,781 | Harvey | Aug. 9, 1921 |
| 1,493,368 | Merz | May 6, 1924 |
| 1,765,136 | Drane | June 17, 1930 |
| 1,946,184 | Abbot | Feb. 6, 1934 |
| 2,486,034 | Katzow | Oct. 25, 1949 |

FOREIGN PATENTS

| | | |
|---|---|---|
| 865,725 | France | Mar. 10, 1941 |
| 427,145 | Italy | Nov. 13, 1947 |
| 435,720 | Italy | May 21, 1948 |